US012794514B2

(12) United States Patent
Gao

(10) Patent No.: US 12,794,514 B2
(45) Date of Patent: Nov. 10, 2026

(54) METHOD FOR ADJUSTING NUMBER OF MULTIPLE IN MULTIPLE OUT TRANSMISSION LAYERS OF TERMINAL AND RELATED DEVICE

(71) Applicant: BEIJING XIAOMI MOBILE SOFTWARE CO., LTD., Beijing (CN)

(72) Inventor: Xueyuan Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 18/692,799

(22) PCT Filed: Sep. 17, 2021

(86) PCT No.: PCT/CN2021/119086
§ 371 (c)(1),
(2) Date: Mar. 15, 2024

(87) PCT Pub. No.: WO2023/039837
PCT Pub. Date: Mar. 23, 2023

(65) Prior Publication Data

US 2024/0396593 A1 Nov. 28, 2024

(51) Int. Cl.
*H04B 7/0413* (2017.01)

(52) U.S. Cl.
CPC .................................. *H04B 7/0413* (2013.01)

(58) Field of Classification Search
CPC .... H04B 7/0413; H04B 7/063; H04B 7/0691; H04B 7/0608
See application file for complete search history.

(56) References Cited

U.S. PATENT DOCUMENTS

| | | | | |
|---|---|---|---|---|
| 2020/0100178 | A1 | 3/2020 | Kim et al. | |
| 2021/0105108 | A1 | 4/2021 | Abdelghaffar et al. | |
| 2022/0322317 | A1* | 10/2022 | Raghavan | H04B 7/0695 |
| 2024/0171249 | A1* | 5/2024 | Elshafie | H04L 5/0048 |

FOREIGN PATENT DOCUMENTS

| | | | |
|---|---|---|---|
| CN | 111464275 | A | 7/2020 |
| CN | 112332891 | A | 2/2021 |
| CN | 112399569 | A | 2/2021 |
| CN | 112564871 | A | 3/2021 |
| CN | 112953606 | A | 6/2021 |

(Continued)

OTHER PUBLICATIONS

The Extended European Search Report issued in EP Application No. 21957121.3 dated Oct. 21, 2024, (36p).

(Continued)

*Primary Examiner* — Ayodeji O Ayotunde
(74) *Attorney, Agent, or Firm* — Arch & Lake LLP; Hao Tan; Shen Wang

(57) ABSTRACT

A method for adjusting a number of multiple in multiple out (MIMO) transmission layers of a terminal includes: receiving, by a network device, switching reporting information of an antenna switching configuration sent by a terminal device; and reconfiguring, by the network device, a maximum number of MIMO transmission layers supported by the terminal device according to the switching reporting information.

17 Claims, 3 Drawing Sheets

(56) References Cited

FOREIGN PATENT DOCUMENTS

| | | | |
|---|---|---|---|
| WO | 2019037158 | A1 | 2/2019 |
| WO | 2020192781 | A1 | 10/2020 |

OTHER PUBLICATIONS

Mediatek Inc., "Summary of [AT110-e][504][PowSav] CP Open and ASN. 1 Issues (Mediatek)", 3GPP TSG-RAN WG2 Meeting #110e, R2-2005863, Jun. 1-12, 2020, (12p).

International Search Report issued on Application No. PCT/CN2021/119086 dated Apr. 7, 2022 with English translation, (4p).

INOA issued in Application No. 202447030334 dated Mar. 30, 2026 with English translation, (9p).

3GPP TR 38.840 V16.0.0, "3rd Generation Partnership Project; Technical Specification Group Radio Access Network; NR; Study on User Equipment (UE) power saving in NR (Release 16)," Jun. 2019, (74p).

3GPP TS 38.331 version 16.5.0 Release 16, "5G; NR; Radio Resource Control (RRC); Protocol specification," ETSI TS 138 331 V16.5.0, Sep. 2021. (941p).

* cited by examiner

METHOD FOR ADJUSTING NUMBER OF MULTIPLE IN MULTIPLE OUT TRANSMISSION LAYERS OF TERMINAL AND RELATED DEVICE

CROSS REFERENCE TO RELATED APPLICATION

This application is the US national phase application of International Application No. PCT/CN2021/119086, filed on Sep. 9, 2021, the entire content of which is hereby incorporated by reference for all purposes.

TECHNICAL FIELD

The present disclosure relates to the field of communication technologies, in particularly, to a method for adjusting a number of multiple in multiple out (MIMO) transmission layers of a terminal and a related device.

BACKGROUND

In a 5G (5th generation mobile communication technology) NR (new radio) system, a base station may limit a number of uplink or downlink data layers of a terminal, that is, a number of uplink or downlink antenna links of the terminal, by configuring a maximum number of MIMO (multiple in multiple out) transmission layers of the terminal. In related arts, the terminal may dynamically perform antenna switching configuration according to its own requirements, but the antenna switching configuration of the terminal does not limit the maximum number of MIMO transmission layers configured by the base station for the terminal.

SUMMARY

A first aspect of the present disclosure provides a method for adjusting a number of multiple in multiple out (MIMO) transmission layers of a terminal. The method includes:

receiving, by a network device, switching reporting information of an antenna switching configuration sent by a terminal device; and reconfiguring, by the network device, a maximum number of MIMO transmission layers supported by the terminal device according to the switching reporting information.

A second aspect of the present disclosure provides a method for adjusting a number of multiple in multiple out (MIMO) transmission layers of a terminal. The method includes:

sending, by a terminal device, switching reporting information of an antenna switching configuration of the terminal device to a network device; and receiving, by the terminal device, a maximum number of MIMO transmission layers supported by the terminal device configured by the network device according to the switching reporting information.

A third aspect of the present disclosure provides a network device. The device includes a processor and a memory having a computer program stored thereon, and the processor is configured to:

receive switching reporting information of an antenna switching configuration sent by a terminal device; and reconfigure a maximum number of MIMO transmission layers supported by the terminal device according to the switching reporting information.

A fourth aspect of the present disclosure provides a terminal device. The terminal device includes a processor and a memory having a computer program stored thereon, and the processor is configured to perform the method according to the second aspect.

A fifth aspect of the present disclosure provides a computer-readable storage medium. The computer-readable storage medium has instructions stored thereon, where, the method according to the first aspect or the second aspect is implemented when the instructions are executed.

BRIEF DESCRIPTION OF THE DRAWINGS

The above and/or additional aspects and advantages of the present disclosure will become obvious and easy to understand from the following description of the embodiments in conjunction with the accompanying drawings, in which.

DETAILED DESCRIPTION

Embodiments of the present disclosure are described in detail below, examples of which are illustrated in the accompanying drawings. When the following descriptions refer to the accompanying drawings, same numbers in different drawings represent same or similar elements unless otherwise indicated. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word "in case of", "if" as used herein may be interpreted as "in a case that" or "when" or "in response to determining".

The embodiments of the present disclosure are described below. Examples of the embodiments are shown in the accompanying drawing, in which the constant same or similar labels indicate the same or similar elements. Embodiments described herein with reference to drawings are explanatory, serve to explain the disclosure, and are not construed to limit embodiments of the disclosure.

In order to better understand a method for adjusting a number of multiple in multiple out (MIMO) transmission layers of a terminal proposed in an embodiment of the present disclosure, the following will first describe a communication system used in an embodiment of the present disclosure.

Figure 1:
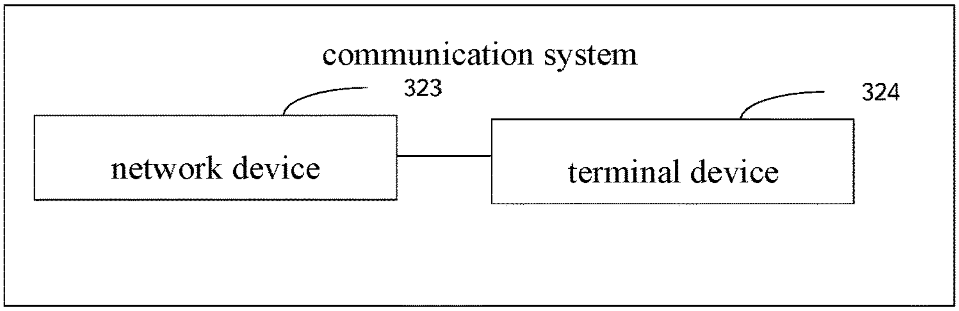
FIG. 1 is a schematic diagram of an architecture of a communication system provided in an embodiment of the present disclosure.

Please refer to FIG. 1, FIG. 1 is a schematic diagram of an architecture of a communication system provided in an embodiment of the present disclosure. The communication system may include, but is not limited to, one network device and one terminal device. Numbers and forms of the devices as illustrated in FIG. 1 are for example only and do not constitute a limitation to embodiments of the present disclosure. In practical applications, the system may include two or more network devices or two or more terminal devices. The communication system as illustrated in FIG. 1 takes including one network device 101 and one terminal device 102 as an example.

It should be noted that the technical solution of embodiments of the present disclosure may be applied to various communication systems, for example, a long-term evolution (LTE) system, a 5th generation (5G) mobile communication system, a 5G new radio (NR) system, or other future new mobile communication systems.

The network device 101 in embodiments of the present disclosure is a physical device for sending or receiving signals at a network side. For example, the network device 101 may be an evolved NodeB (eNB), a transmission/reception point (TRP), a next generation NodeB (gNB) in an NR system, base stations in other future mobile communication systems, or access nodes in wireless fidelity (WiFi) systems, etc. A specific technology and a specific device form adopted by the network device are not limited in embodiments of the present disclosure. The network device provided in embodiments of the present disclosure may be composed of a central unit (CU) and a distributed unit (DU). The CU may also be referred to as a control unit. A CU-DU structure may be adopted to separate protocol layers of the network device, such as a base station. Functions of some protocol layers may be controlled centrally by the CU, and functions of the remaining or all protocol layers may be distributed within the DU which is centrally controlled by the CU.

The terminal device 102 in embodiments of the present disclosure is physical device for receiving or sending signals at a user side, such as a mobile phone. The terminal device may also be referred to as a terminal, a user equipment (UE), a mobile station (MS), a mobile terminal (MT), etc. The terminal device may be a vehicle with a communication feature, a smart vehicle, a mobile phone, a wearable device, a pad, a computer with a wireless transceiver feature, a virtual reality (VR) terminal, an augmented reality (AR) terminal, a wireless terminal in industrial control, and a wireless terminal in self-driving, a wireless terminal in remote medical surgery, a wireless terminal in smart grid, a wireless terminal in transportation safety, a wireless terminal in smart city, and a wireless terminal in smart home, etc. A specific technology and a specific device form adopted by the terminal device are not limited in embodiments of the present disclosure.

The network device 101 may limit a number of uplink or downlink data layers of the terminal device 102, that is, a number of uplink or downlink antenna links, by configuring a maximum number of MIMO transmission layers. The terminal device 102 may have a plurality of transmit antennas (Tx) and a plurality of receive antennas (Rx), but not necessarily all transmit antennas and all receive antennas are to be used for data transmission with the network device 101. The terminal device 102 may trigger an antenna switching configuration based on its own requirements, that is, select, according to its own configuration, a number of transmit antennas and/or a number of receive antennas configured for data transmission with the network device 101, namely, a number of sending channels and/or a number of receiving channels configured for data transmission with the network device 101.

In related arts, the antenna switching configuration of the terminal device 102 does not limit the maximum number of MIMO transmission layers configured by the network device 101 for the terminal device 102, therefore, the maximum number of MIMO transmission layers configured by the network device 101 for the terminal device 102 may not match an antenna switching configuration required by the terminal device 102, resulting in reduced reliability of communication links, and unconducive to terminal power-saving. For example, the terminal device 102 has 4 receive antennas, and, according to its own requirements, triggers the antenna switching configuration, selects and configures 2 receive antennas for downlink data transmission with the network device 101, that is, the terminal device 102 is configured with 2 receiving channels, the network device 101, however, still configures a maximum number of MIMO transmission layers with downlink 4 layers for the terminal device, therefore, the terminal device 102 still needs to prepare for receiving according to the maximum number of MIMO transmission layers with 4 layers, that is, activate at least 4 antenna links, namely, configure 4 receive antennas all for downlink data transmission. As such, 4 receiving channels are prepared, and channel state information estimation is performed according to the 4 receiving channels, which results in reduced reliability of channel state information (CSI) estimation, and is not conducive to terminal power-saving.

In embodiments of the present disclosure, with receiving switching reporting information of an antenna switching configuration sent by a terminal device, and reconfiguring a maximum number of MIMO transmission layers supported by the terminal device according to the switching reporting information, the network device may perform different scheduling according to antenna switching configurations for different types of requirements of the terminal, causing the maximum number of MIMO transmission layers configured by the network device to match an antenna switching requirement of the terminal. Therefore, a reliability of CSI estimation is improved, a system resource is saved, and it is conducive to terminal power-saving.

It can be understood that the communication system described in embodiments of the present disclosure is intended to provide a clearer explanation of the technical solution of embodiments of the present disclosure, and does not constitute a limitation on the technical solution proposed in embodiments of the present disclosure. As those ordinary skilled in the art known, with evolution of the system architecture and emergence of new business scenarios, the technical solution proposed in embodiments of the present disclosure is also applicable to similar technical problems.

A method and an apparatus for adjusting a number of multiple in multiple out (MIMO) transmission layers of a terminal provided in the present disclosure are described in detail with reference to the accompany drawings below.

Figure 2:
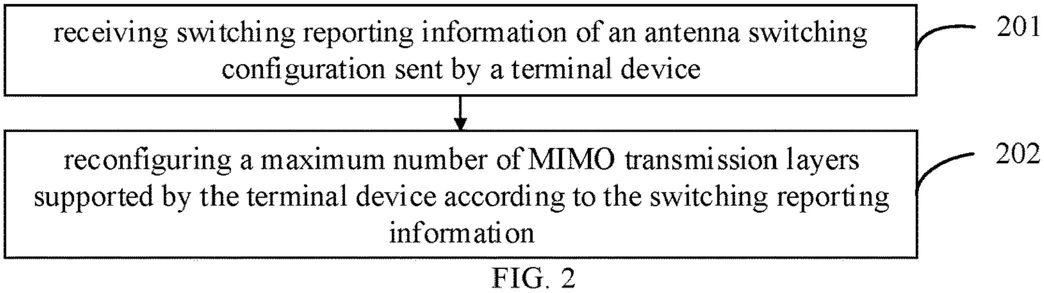
FIG. 2 is a flowchart of a method for adjusting a number of multiple in multiple out (MIMO) transmission layers of a terminal provided in an embodiment of the present disclosure.

FIG. 2 is a flowchart of a method for adjusting a number of multiple in multiple out (MIMO) transmission layers of a terminal provided in an embodiment of the present disclosure. It should be noted that the method in an embodiment of the present disclosure is performed by a network device.

As illustrated in FIG. 2, the method for adjusting the number of MIMO transmission layers of the terminal includes following steps.

Step 201, switching reporting information of an antenna switching configuration sent by a terminal device is received.

The switching reporting information of the antenna switching configuration is reporting information sent by the terminal device to the network device when the switching configuration is triggered according to requirements of the terminal itself. As mentioned above, the antenna switching configuration means that the terminal can select and configure, according to requirements of the terminal itself, a number of transmit antennas and/or a number of receive antennas used for data transmission with the network device, namely, a number of sending channels and/or a number of receiving channels used for data transmission with the network device.

As a first possible implementation, the switching reporting information includes an antenna switching configuration to be triggered by the terminal device and event information of the antenna switching configuration.

As a second possible implementation, the switching reporting information includes an antenna switching configuration to be triggered by the terminal device.

As a third possible implementation, the switching reporting information includes event information of the antenna switching configuration.

The antenna switching configuration to be triggered by the terminal device includes at least one of the number of sending channels and the number of receiving channels. The event information of the antenna switching configuration can indicate an event for triggering the antenna switching configuration.

Optionally, the event information of the antenna switching configuration is a trigger level or a reporting cause.

The trigger level indicates a level of the event for triggering the antenna switching configuration, which may also be a degree of urgency and intensity of requirements of the terminal device. The reporting cause indicates a specific cause of the event for triggering the antenna switching configuration.

It should be noted that when the event information of the antenna switching configuration of the terminal device is the trigger level, the terminal device may determine the trigger level according to a level of the trigger event based on a preset rule and protocol. When the event information of the antenna switching configuration of the terminal device is the reporting cause, the network device may determine the degree of urgency and intensity of the event for triggering the antenna switching configuration according to the reporting cause based on a preset rule and protocol.

Optionally, the trigger level includes a first level and a second level, and the second level is smaller than the first level. That is, a degree of urgency and intensity of the second level is less than a degree of urgency and intensity of the first level.

Optionally, the reporting cause includes a first type of cause and a second type of cause. A degree of urgency and intensity of the second type of cause is less than a degree of urgency and intensity of the first type of cause. That is, the network device may determine whether the cause of the event for triggering the antenna switching configuration is the first type of cause or the second type of cause according to the reporting cause based on the preset rule and protocol.

It is understandable that there are many events for triggering the antenna switching configuration by the terminal device, such as the terminal device having power-saving requirements, a damage to some antennas of the terminal device, a change in multiplexing of some antennas of the terminal device, and a demand to change a number of antenna links based on channel estimation, etc.

Step 202: a maximum number of MIMO transmission layers supported by the terminal device is reconfigured according to the switching reporting information.

In other words, the network device may adjust and configure the maximum number of MIMO transmission layers supported by the terminal device according to the antenna switching reporting information.

The maximum number of MIMO transmission layers supported by the terminal device includes a maximum number of uplink MIMO transmission layers and a maximum number of downlink MIMO transmission layers which are a maximum number of uplink antenna links and a maximum number of downlink antenna links used for data transmission with the network device and supported by the terminal device, namely a maximum number of sending channels and a maximum number of receiving channels.

It can be understood that the maximum number of uplink MIMO transmission layers and the maximum number of downlink MIMO transmission layers may be the same or different.

In an embodiment of the present disclosure, as a first possible implementation, the network device reconfigures the maximum number of uplink MIMO transmission layers supported by the terminal device. As a second possible implementation, the network device reconfigures the maximum number of downlink MIMO transmission layers supported by the terminal device. As a third possible implementation, the network device reconfigures the maximum number of uplink MIMO transmission layers and the maximum number of downlink MIMO transmission layers both supported by the terminal device.

In some implementations, after reconfiguration, the network device sends a reconfigured maximum number of MIMO transmission layers to the terminal device.

Optionally, the network device sends the reconfigured maximum number of MIMO transmission layers to the terminal device through a RRC (radio resource control) signaling.

In summary, with receiving the switching reporting information of the antenna switching configuration sent by the terminal device, and reconfiguring the maximum number of MIMO transmission layers supported by the terminal device according to the switching reporting information, the network device may perform different scheduling according to the antenna switching configurations for different types of requirements of the terminal, and adjust the maximum number of MIMO transmission layers configured for the terminal device, causing the maximum number of MIMO transmission layers configured by the network device to match an antenna switching requirement of the terminal. Therefore, a reliability of CSI estimation is improved, a system resource is saved, and it is conducive to terminal power-saving.

Figure 3:
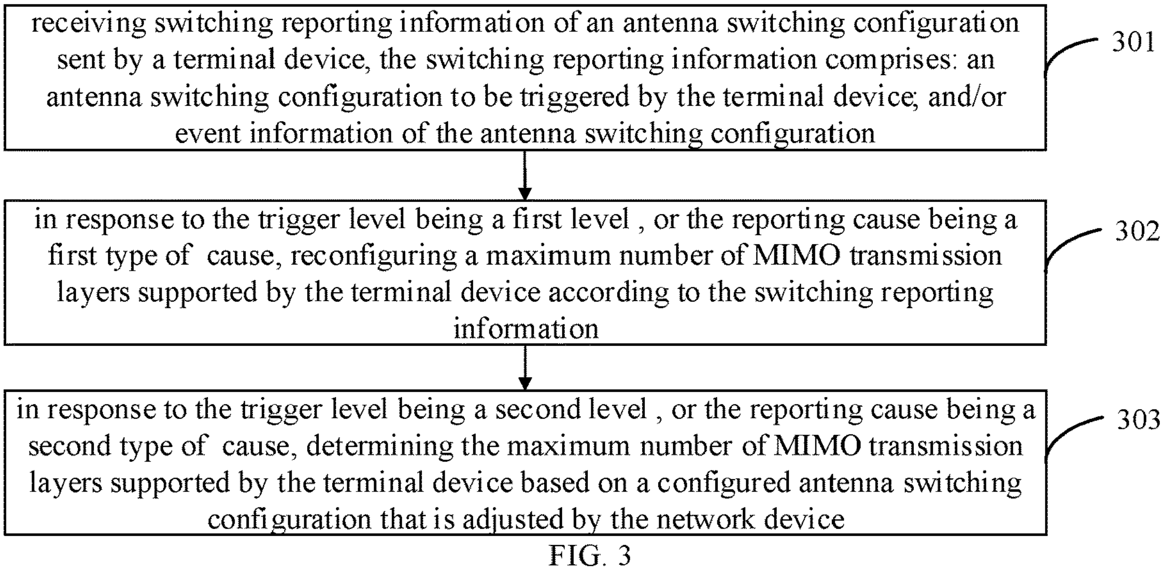
FIG. 3 is a flowchart of another method for adjusting a number of multiple in multiple out (MIMO) transmission layers of a terminal provided in an embodiment of the present disclosure.

An embodiment of the present disclosure provides another method for adjusting a number of multiple in multiple out (MIMO) transmission layers of a terminal. FIG. 3 is a flowchart of another method for adjusting a number of multiple in multiple out (MIMO) transmission layers of a terminal provided in an embodiment of the present disclosure. The method may be performed by a network device, and the method for adjusting the number of multiple in multiple out (MIMO) transmission layers of the terminal may be performed alone, or may be performed in combination with any embodiment in the present disclosure or a possible implementation in an embodiment, or may also be performed in combination with any technical solution in related arts.

As illustrated in FIG. 3, the method for adjusting the number of MIMO transmission layers of the terminal may include following steps.

Step 301, switching reporting information of an antenna switching configuration sent by a terminal device is received, and the switching reporting information includes an antenna switching configuration to be triggered by the terminal device and event information of the antenna switching configuration.

The antenna switching configuration to be triggered by the terminal device includes at least one of a first number of sending channels and a first number of receiving channels. The event information of the antenna switching configuration is a trigger level or a reporting cause.

The trigger level includes a first level and a second level, and the second level is smaller than the first level. The reporting cause includes a first type of cause and a second type of cause.

It should be noted that a degree of urgency and intensity of the second type of cause is less than a degree of urgency and intensity of the first type of cause. That is, the network device may determine whether the cause of the event for triggering the antenna switching configuration is the first type of cause or the second type of cause according to the reporting cause based on the preset rule and protocol.

In addition, it should be noted that when the event information of the antenna switching configuration of the terminal device is the trigger level, the terminal device may determine the trigger level according to a level of the trigger event based on a preset rule and protocol. When the event information of the antenna switching configuration of the terminal device is the reporting cause, the network device may determine the degree of urgency and intensity of the event for triggering the antenna switching configuration, which is the first type of cause or the second type of cause, according to the reporting cause based on a preset rule and protocol.

For example, the first type of cause may be that the terminal has causes and requirements capable of seriously affecting a quality of a communication link, such as, a strong power-saving requirement, a damage to some antennas, or a change in multiplexing of some antennas. The second type of cause may be the terminal has causes and requirements not capable of seriously affecting a quality of a communication link, such as, a power-saving requirement, a demand to change a number of antenna links based on channel estimation, or an antenna gain estimation. Similarly, the terminal device determines that the trigger event is the event capable of seriously affecting the quality of the communication link, such as the damage to some antennas, determines that the trigger level is the first level, and determines that the trigger event is the event not capable of seriously affecting the quality of the communication link, such as, the demand to change the number of antenna links based on the channel estimation, or the antenna gain estimation, and determines that the trigger level is the second level.

It can be understood that the above-mentioned classification of the event information is only an illustrative explanation, and the network device and the terminal device may set a classification rule and protocol that the triggering event for triggering the antenna switching configuration belongs to the first level or the second level or belongs to the first cause or the second cause according to a current application scenario, a service requirement, a channel quality, and a capability of the terminal device.

Step 302, in response to the trigger level being the first level, or the reporting cause being the first type of cause, the maximum number of MIMO transmission layers supported by the terminal device is reconfigured according to the switching reporting information.

As a first possible implementation, a first number of sending channels of the antenna switching configuration is determined, and a maximum number of uplink MIMO transmission layers supported by the terminal device is determined according to the first number of sending channels and a preset maximum number of uplink MIMO transmission layers supported by the terminal device.

As a second possible implementation, a first number of receiving channels of the antenna switching configuration is determined, and a maximum number of downlink MIMO transmission layers supported by the terminal device is determined according to the first number of receiving channels and a preset maximum number of downlink MIMO transmission layers supported by the terminal device.

As a third possible implementation, a first number of sending channels of the antenna switching configuration is determined, and a maximum number of uplink MIMO transmission layers supported by the terminal device is determined according to the first number of sending channels and a preset maximum number of uplink MIMO transmission layers supported by the terminal device, and a first number of receiving channels of the antenna switching configuration is determined, and a maximum number of downlink MIMO transmission layers supported by the terminal device is determined according to the first number of receiving channels and a preset maximum number of downlink MIMO transmission layers supported by the terminal device.

The preset maximum number of uplink MIMO transmission layers supported by the terminal device is a supported maximum number of uplink MIMO transmission layers configured before the current antenna switching configuration to be triggered by the terminal device. The preset maximum number of uplink MIMO transmission layers may be a maximum number of uplink MIMO transmission layers supported by the terminal device which is configured by the network device, or may be a maximum number of uplink MIMO transmission layers that can be supported and pre-reported by the terminal device.

Optionally, the network device sends the preset maximum number of uplink MIMO transmission layers through a RRC signaling.

It can be understood that, similarly, the preset maximum number of downlink MIMO transmission layers supported by the terminal device is a supported maximum number of downlink MIMO transmission layers configured before the current antenna switching configuration to be triggered by the terminal device. The preset maximum number of downlink MIMO transmission layers may be a maximum number of downlink MIMO transmission layers supported by the terminal device which is configured by the network device, or may be a maximum number of downlink MIMO transmission layers that can be supported and pre-reported by the terminal device.

Optionally, the network device sends the preset maximum number of downlink MIMO transmission layers through a RRC signaling.

It should be noted that the trigger level being the first level, or the reporting cause being the first type of cause may indicate that a level of the event for triggering the antenna switching configuration is higher, and a degree of urgency and intensity of requirements of the terminal device being higher.

Further, determining the maximum number of uplink MIMO transmission layers supported by the terminal device according to the first number of sending channels and the preset maximum number of uplink MIMO transmission layers supported by the terminal device includes: determining a minimum value between the first number of sending channels and the preset maximum number of uplink MIMO transmission layers as the maximum number of uplink MIMO transmission layers supported by the terminal device.

Determining the maximum number of downlink MIMO transmission layers supported by the terminal device according to the first number of receiving channels and the preset maximum number of downlink MIMO transmission layers supported by the terminal device includes: determining a minimum value between the first number of receiving channels and the preset maximum number of downlink MIMO transmission layers as the maximum number of downlink MIMO transmission layers supported by the terminal device In some implementations, after reconfiguration, the network device sends a reconfigured maximum number of MIMO transmission layers to the terminal device.

Step 303: in response to the trigger level being the second level, or the reporting cause being the second type of cause, the maximum number of MIMO transmission layers supported by the terminal device is determined based on a configured antenna switching configuration that is adjusted by the network device.

The configured antenna switching configuration that is adjusted by the network device is a configuration obtained after the network device adjusts the antenna switching configuration reported by the terminal device in response to the trigger level being the second level, or the reporting cause being the second type of cause.

It can be understood that the network device can adjust the antenna switching configuration according to at least one of the antenna switching configuration reported by the terminal device, the current application scenario, the current service, the channel quality, and the capability supported by the terminal device, to obtain the configured antenna switching configuration that is adjusted.

The configured antenna switching configuration that is adjusted includes at least one of a second number of sending channels and a second number of receiving channels.

As a first possible implementation, a second number of sending channels of the configured antenna switching configuration that is adjusted is determined, and a maximum number of uplink MIMO transmission layers supported by the terminal device is determined according to the second number of sending channels and a preset maximum number of uplink MIMO transmission layers supported by the terminal device.

As a second possible implementation, a second number of receiving channels of the configured antenna switching configuration that is adjusted is determined, and a maximum number of downlink MIMO transmission layers supported by the terminal device is determined according to the second number of receiving channels and a preset maximum number of downlink MIMO transmission layers supported by the terminal device.

As a third possible implementation, a second number of sending channels of the configured antenna switching configuration that is adjusted is determined, and a maximum number of uplink MIMO transmission layers supported by the terminal device is determined according to the second number of sending channels and a preset maximum number of uplink MIMO transmission layers supported by the terminal device, and a second number of receiving channels of the configured antenna switching configuration that is adjusted is determined, and a maximum number of downlink MIMO transmission layers supported by the terminal device is determined according to the second number of receiving channels and a preset maximum number of downlink MIMO transmission layers supported by the terminal device.

Further, determining the maximum number of uplink MIMO transmission layers supported by the terminal device according to the second number of sending channels and the preset maximum number of uplink MIMO transmission layers supported by the terminal device includes: determining a minimum value between the second number of sending channels and the preset maximum number of uplink MIMO transmission layers as the maximum number of uplink MIMO transmission layers supported by the terminal device.

Determining the maximum number of downlink MIMO transmission layers supported by the terminal device according to the second number of receiving channels and the preset maximum number of downlink MIMO transmission layers supported by the terminal device includes: determining a minimum value between the second number of receiving channels and the preset maximum number of downlink MIMO transmission layers as the maximum number of downlink MIMO transmission layers supported by the terminal device.

In some implementations, after reconfiguration, the network device sends the reconfigured maximum number of MIMO transmission layers to the terminal device.

In summary, with receiving the switching reporting information of the antenna switching configuration sent by the terminal device, the switching reporting information including the antenna switching configuration to be triggered by the terminal device and the event information of the antenna switching configuration, in response to the trigger level being the first level, or the reporting cause being the first type of cause, reconfiguring the maximum number of MIMO transmission layers supported by the terminal device according to the switching reporting information, in response to the trigger level being the second level, or the reporting cause being the second type of cause, determining the maximum number of MIMO transmission layers supported by the terminal device based on the configured antenna switching configuration that is adjusted by the network device, the network device may perform different scheduling according to the antenna switching configurations for different types of requirements of the terminal, and adjust the maximum number of MIMO transmission layers configured for the terminal device, causing the maximum number of MIMO transmission layers configured by the network device to match an antenna switching requirement of the terminal. Therefore, a reliability of CSI estimation is improved, a system resource is saved, and it is conducive to terminal power-saving.

Figure 4:
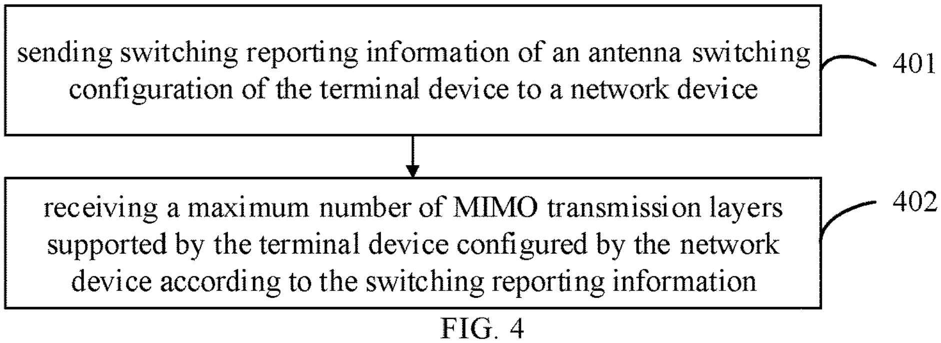
FIG. 4 is a flowchart of another method for adjusting a number of multiple in multiple out (MIMO) transmission layers of a terminal provided in an embodiment of the present disclosure.

An embodiment of the present disclosure provides another method for adjusting a number of multiple in multiple out (MIMO) transmission layers of a terminal. FIG. 4 is a flowchart of another method for adjusting a number of multiple in multiple out (MIMO) transmission layers of a terminal provided in an embodiment of the present disclosure. It should be noted that the method in an embodiment of the present disclosure is performed by a terminal device.

As illustrated in FIG. 4, the method for adjusting the number of MIMO transmission layers of the terminal may include following steps.

Step 401, switching reporting information of an antenna switching configuration of the terminal device is sent to a network device.

The switching reporting information of the antenna switching configuration is reporting information sent by the terminal device to the network device when the switching configuration is triggered according to requirements of the terminal itself. As mentioned above, the antenna switching configuration means that the terminal can select and configure, according to requirements of the terminal itself, a number of sending antennas and/or a number of receive antennas used for data transmission with the network device, namely, a number of sending channels and/or a number of receiving channels used for data transmission with the network device.

As a first possible implementation, the switching reporting information includes an antenna switching configuration to be triggered by the terminal device and event information of the antenna switching configuration.

As a second possible implementation, the switching reporting information includes an antenna switching configuration to be triggered by the terminal device.

As a third possible implementation, the switching reporting information includes event information of the antenna switching configuration.

The antenna switching configuration to be triggered by the terminal device includes at least one of the number of sending channels and the number of receiving channels. The event information of the antenna switching configuration can indicate an event for triggering the antenna switching configuration.

Optionally, the event information of the antenna switching configuration is a trigger level or a reporting cause.

The trigger level indicates a level of the event for triggering the antenna switching configuration, which may also be a degree of urgency and intensity of requirements of the terminal device. The reporting cause indicates a specific cause of the event for triggering the antenna switching configuration.

It should be noted that when the event information of the antenna switching configuration of the terminal device is the trigger level, the terminal device may determine the trigger level according to a level of the trigger event based on a preset rule and protocol. When the event information of the antenna switching configuration of the terminal device is the reporting cause, the network device may determine the degree of urgency and intensity of the event for triggering the antenna switching configuration according to the reporting cause based on a preset rule and protocol.

Optionally, the trigger level includes a first level and a second level, and the second level is smaller than the first level. That is, a degree of urgency and intensity of the second level is less than a degree of urgency and intensity of the first level.

Optionally, the reporting cause includes a first type of cause and a second type of cause. A degree of urgency and intensity of the second type of cause is less than a degree of urgency and intensity of the first type of cause. That is, the network device may determine whether the cause of the event for triggering the antenna switching configuration is the first type of cause or the second type of cause according to the reporting cause based on the preset rule and protocol.

It is understandable that there are many events for triggering the antenna switching configuration by the terminal device, such as the terminal device having power-saving requirements, a damage to some antennas of the terminal device, a change in multiplexing of some antennas of the terminal device, and a demand to change a number of antenna links based on channel estimation, etc.

Step 402, a maximum number of MIMO transmission layers supported by the terminal device configured by the network device according to the switching reporting information is received.

The maximum number of MIMO transmission layers supported by the terminal device includes a maximum number of uplink MIMO transmission layers and a maximum number of downlink MIMO transmission layers which are a maximum number of uplink antenna links and a maximum number of downlink antenna links used for data transmission with the network device and supported by the terminal device, namely a maximum number of sending channels and a maximum number of receiving channels.

It can be understood that the maximum number of uplink MIMO transmission layers and the maximum number of downlink MIMO transmission layers may be the same or different.

In an embodiment of the present disclosure, as a first possible implementation, the network device reconfigures the maximum number of uplink MIMO transmission layers supported by the terminal device. As a second possible implementation, the network device reconfigures the maximum number of downlink MIMO transmission layers supported by the terminal device. As a third possible implementation, the network device reconfigures the maximum number of uplink MIMO transmission layers and the maximum number of downlink MIMO transmission layers both supported by the terminal device.

Optionally, the terminal device receives the reconfigured maximum number of MIMO transmission layers by receiving a RRC signaling from the network device.

In some implementations, the maximum number of MIMO transmission layers takes immediate effect after the terminal device receives the maximum number of MIMO transmission layers. That is, the terminal device performs data transmission according to the maximum number of MIMO transmission layers.

In summary, with sending the switching reporting information of the antenna switching configuration of the terminal device to the network device, and receiving the maximum number of MIMO transmission layers supported by the terminal device configured by the network device according to the switching reporting information, the network device may perform different scheduling according to antenna switching configurations for different types of requirements of the terminal, and adjust the maximum number of MIMO transmission layers configured for the terminal device, causing the maximum number of MIMO transmission layers configured by the network device to match an antenna switching requirement of the terminal. Therefore, a reliability of CSI estimation is improved, a system resource is saved, and it is conducive to terminal power-saving.

Figure 5:
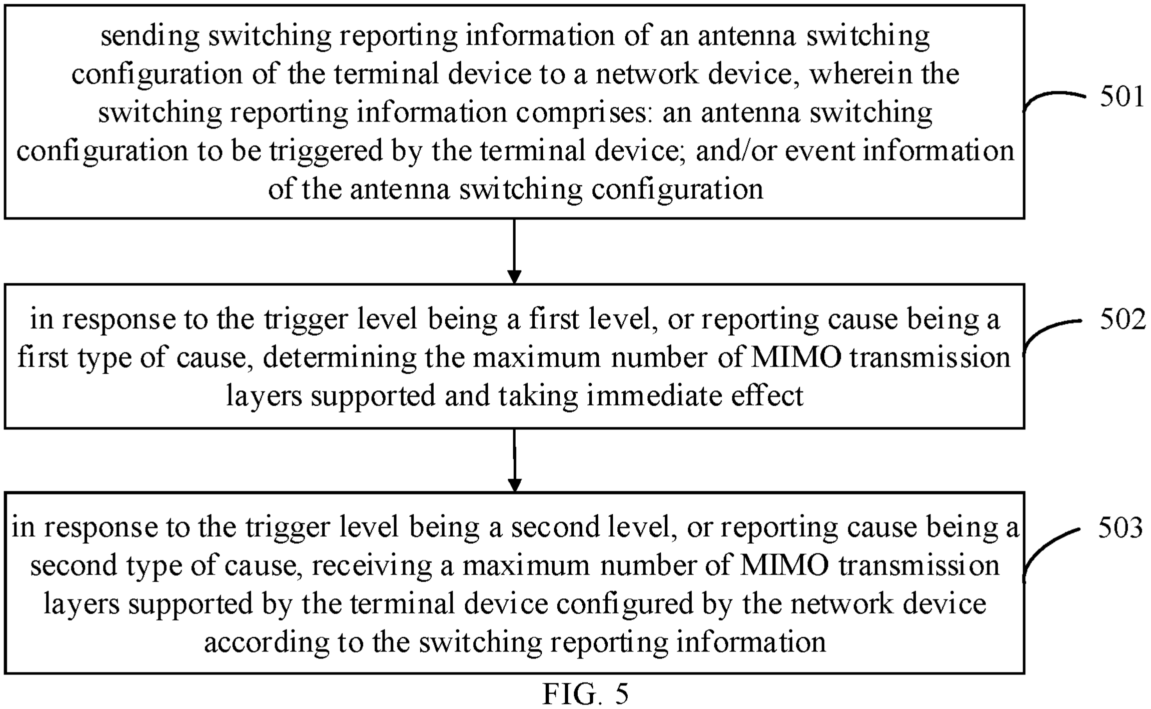
FIG. 5 is a flowchart of another method for adjusting a number of multiple in multiple out (MIMO) transmission layers of a terminal provided in an embodiment of the present disclosure.

An embodiment of the present disclosure provides another method for adjusting a number of multiple in multiple out (MIMO) transmission layers of a terminal. FIG. 5 is a flowchart of another method for adjusting a number of multiple in multiple out (MIMO) transmission layers of a terminal provided in an embodiment of the present disclosure. The method may be performed by a terminal device, and the method for adjusting the number of multiple in multiple out (MIMO) transmission layers of the terminal may be performed alone, or may be performed in combination with any embodiment in the present disclosure or a possible implementation in an embodiment, or may also be performed in combination with any technical solution in related arts.

As illustrated in FIG. 5, the method for adjusting the number of MIMO transmission layers of the terminal may include following steps.

Step 501: switching reporting information of an antenna switching configuration of the terminal device is sent to a network device, and the switching reporting information includes an antenna switching configuration to be triggered by the terminal device and event information of the antenna switching configuration.

The antenna switching configuration to be triggered by the terminal device includes at least one of a first number of sending channels and a first number of receiving channels. The event information of the antenna switching configuration is a trigger level or a reporting cause.

The trigger level includes a first level and a second level, and the second level is smaller than the first level. The reporting cause includes a first type of cause and a second type of cause.

It should be noted that a degree of urgency and intensity of the second type of cause is less than a degree of urgency and intensity of the first type of cause. That is, the network device may determine whether the cause of the event for triggering the antenna switching configuration is the first type of cause or the second type of cause according to the reporting cause based on the preset rule and protocol.

In addition, it should be noted that when the event information of the antenna switching configuration of the terminal device is the trigger level, the terminal device may determine the trigger level according to a level of the trigger event based on a preset rule and protocol. When the event information of the antenna switching configuration of the terminal device is the reporting cause, the terminal device and the network device may determine the degree of urgency and intensity of the event for triggering the antenna switching configuration, which is the first type of cause or the second type of cause, according to the reporting cause based on a preset rule and protocol.

For example, the first type of cause may be that the terminal has causes and requirements capable of seriously affecting a quality of a communication link, such as, a strong power-saving requirement, a damage to some antennas, or a change in multiplexing of some antennas. The second type of cause may be the terminal has causes and requirements not capable of seriously affecting a quality of a communication link, such as, a power-saving requirement, a demand to change a number of antenna links based on channel estimation, or an antenna gain estimation. Similarly, the terminal device determines that the trigger event is the event capable of seriously affecting the quality of the communication link, such as the damage to some antennas, determines that the trigger level is the first level, and determines that the trigger event is the event not capable of seriously affecting the quality of the communication link, such as, the demand to change the number of antenna links based on the channel estimation, or the antenna gain estimation, and determines that the trigger level is the second level.

It can be understood that the above-mentioned classification of the event information is only an illustrative explanation, and the network device and the terminal device may set a classification rule and protocol that the triggering event for triggering the antenna switching configuration belongs to the first level or the second level or belongs to the first cause or the second cause according to a current application scenario, a service requirement, a channel quality, and a capability of the terminal device.

Step 502, in response to the trigger level being the first level, or the reporting cause being the first type of cause, the maximum number of MIMO transmission layers supported is determined and takes immediate effect.

In response to the trigger level being the first level, or the reporting cause being the first type of cause, after sending the switching reporting information of the antenna switching configuration of the terminal device to the network device, the terminal device determines the maximum number of MIMO transmission layers supported by itself and takes immediate effect, that is, performs data transmission according to the determined maximum number of MIMO transmission layers supported.

In other words, in response to the trigger level being the first level, or the reporting cause being the first type of cause, the terminal device directly determines the maximum number of MIMO transmission layers supported by itself and takes immediate effect after sending the reporting information to the network device, without necessary to wait until it receives the maximum number of MIMO transmission layers supported by the terminal device which is reconfigured by the network device, and then determines the maximum number of MIMO transmission layers. Therefore, a response efficiency of configuration is improved and overhead is reduced.

As a first possible implementation, a first number of sending channels of the antenna switching configuration is determined, and a maximum number of uplink MIMO transmission layers supported by the terminal device is determined according to the first number of sending channels and a preset maximum number of uplink MIMO transmission layers supported by the terminal device.

As a second possible implementation, a first number of receiving channels of the antenna switching configuration is determined, and a maximum number of downlink MIMO transmission layers supported by the terminal device is determined according to the first number of receiving channels and a preset maximum number of downlink MIMO transmission layers supported by the terminal device.

As a third possible implementation, a first number of sending channels of the antenna switching configuration is determined, and a maximum number of uplink MIMO transmission layers supported by the terminal device is determined according to the first number of sending channels and a preset maximum number of uplink MIMO transmission layers supported by the terminal device, and a first number of receiving channels of the antenna switching configuration is determined, and a maximum number of downlink MIMO transmission layers supported by the terminal device is determined according to the first number of receiving channels and a preset maximum number of downlink MIMO transmission layers supported by the terminal device.

The preset maximum number of uplink MIMO transmission layers supported by the terminal device is a supported maximum number of uplink MIMO transmission layers configured before the current antenna switching configuration to be triggered by the terminal device. The preset maximum number of uplink MIMO transmission layers may be a maximum number of uplink MIMO transmission layers supported by the terminal device which is configured by the network device, or may be a maximum number of uplink MIMO transmission layers that can be supported and pre-reported by the terminal device.

Optionally, the network device sends the preset maximum number of uplink MIMO transmission layers through a RRC signaling.

It can be understood that, similarly, the preset maximum number of downlink MIMO transmission layers supported by the terminal device is a supported maximum number of downlink MIMO transmission layers configured before the current antenna switching configuration to be triggered by the terminal device. The preset maximum number of downlink MIMO transmission layers may be a maximum number of downlink MIMO transmission layers supported by the terminal device which is configured by the network device, or may be a maximum number of downlink MIMO transmission layers that can be supported and pre-reported by the terminal device.

Optionally, the network device sends the preset maximum number of downlink MIMO transmission layers through a RRC signaling.

Further, determining the maximum number of uplink MIMO transmission layers supported by the terminal device according to the first number of sending channels and the preset maximum number of uplink MIMO transmission layers supported by the terminal device includes: determining a minimum value between the first number of sending channels and the preset maximum number of uplink MIMO transmission layers as the maximum number of uplink MIMO transmission layers supported by the terminal device.

Determining the maximum number of downlink MIMO transmission layers supported by the terminal device according to the first number of receiving channels and the preset maximum number of downlink MIMO transmission layers supported by the terminal device includes: determining a minimum value between the first number of receiving channels and the preset maximum number of downlink MIMO transmission layers as the maximum number of downlink MIMO transmission layers supported by the terminal device.

Step 503, in response to the trigger level being the second level, or the reporting cause being the second type of cause, a maximum number of MIMO transmission layers supported by the terminal device configured by the network device according to the switching reporting information is received.

In response to the trigger level being the second level, or the reporting cause being the second type of cause, after the terminal device receives the maximum number of MIMO transmission layers supported by the terminal device configured by the network device according to the switching reporting information, the maximum number of MIMO transmission layers takes effect.

In summary, with sending the switching reporting information of the antenna switching configuration of the terminal device to the network device, the switching reporting information including the antenna switching configuration to be triggered by the terminal device and the event information of the antenna switching configuration, in response to the trigger level being the first level, or the reporting cause being the first type of cause, determining the maximum number of MIMO transmission layers supported and taking immediate effect, in response to the trigger level being the second level, or the reporting cause being the second type of cause, receiving the maximum number of MIMO transmission layers supported by the terminal device configured by the network device according to the switching reporting information, the network device may perform different scheduling according to the antenna switching configurations for different types of requirements of the terminal, and adjust the maximum number of MIMO transmission layers configured for the terminal device, causing the maximum number of MIMO transmission layers configured by the network device to match an antenna switching requirement of the terminal. Therefore, a reliability of CSI estimation is improved, a system resource is saved, and it is conducive to terminal power-saving.

In embodiments provided in the present disclosure, the method proposed in the present disclosure is introduced from perspectives of the network device and the terminal device. In order to achieve functions of the method proposed in embodiments of the present disclosure, the network device and the terminal device may include hardware structures and software modules, to achieve the above functions in form of hardware structures, software modules, or a combination of hardware structures and software modules. One of the above functions can be executed in the form of hardware structures, software modules, or the combination of hardware structures and software modules.

Figure 6:
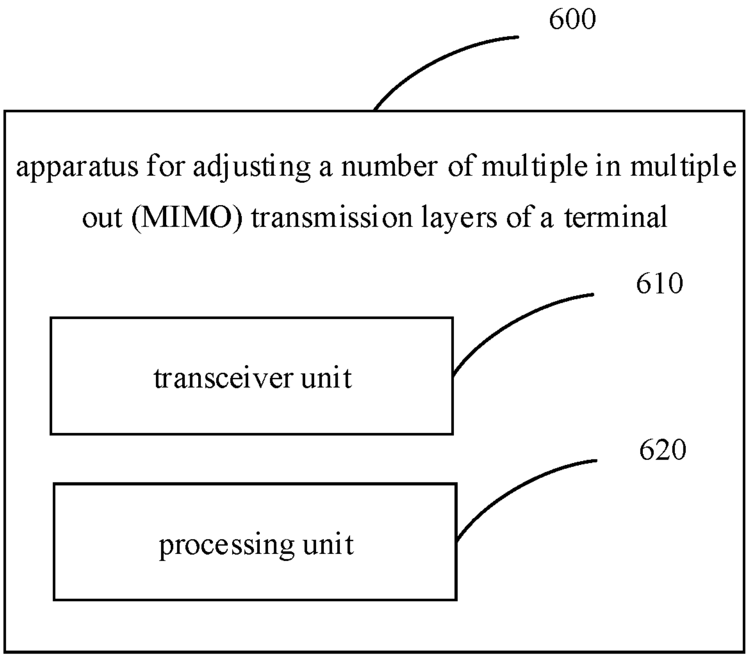
FIG. 6 is a schematic diagram of an architecture of an apparatus for adjusting a number of multiple in multiple out (MIMO) transmission layers of a terminal provided in an embodiment of the present disclosure.
Figure 7:
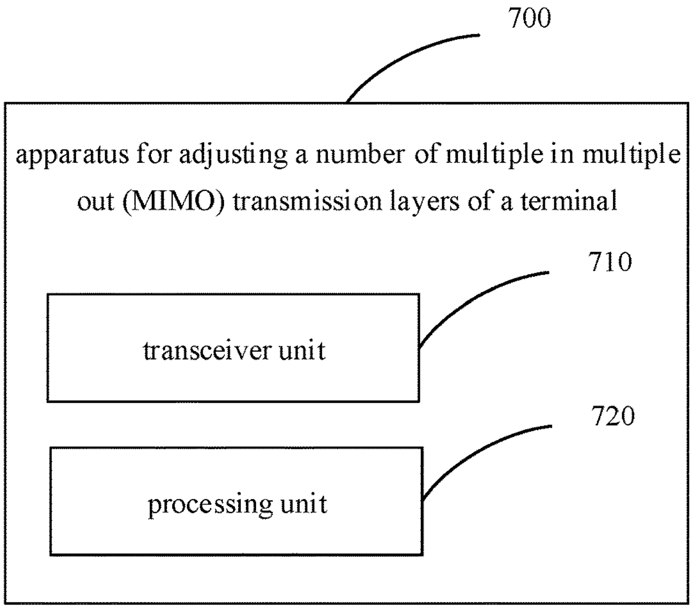
FIG. 7 is a schematic diagram of an architecture of another apparatus for adjusting a number of multiple in multiple out (MIMO) transmission layers of a terminal provided in an embodiment of the present disclosure.

Corresponding to the methods for adjusting the number of multiple in multiple out (MIMO) transmission layers of the terminal provided in the above several embodiments, the present disclosure also provides an apparatus for adjusting a number of multiple in multiple out (MIMO) transmission layers of a terminal. Since the apparatus for adjusting the number of multiple in multiple out (MIMO) transmission layers of the terminal provided by embodiments of the present disclosure corresponds to the methods provided in the above several embodiments. Therefore, an implementation of the method for the number of multiple in multiple out (MIMO) transmission layers of the terminal is also applicable to the apparatus for adjusting the number of multiple in multiple out (MIMO) transmission layers of the terminal provided by embodiments of the present disclosure, which will not be described in detail in this embodiment. FIGS. 6-7 are schematic diagrams of an architecture of another apparatus for adjusting a number of multiple in multiple out (MIMO) transmission layers of a terminal provided in an embodiment of the present disclosure.

FIG. 6 is a schematic diagram of an architecture of an apparatus for adjusting a number of multiple in multiple out (MIMO) transmission layers of a terminal provided in an embodiment of the present disclosure. The apparatus is applicable for a network device.

As illustrated in FIG. 6, the apparatus 600 for adjusting the adjusting the number of multiple in multiple out (MIMO) transmission layers of the terminal includes: a transceiver unit 610 and a processing unit 620.

The transceiver unit 610 is configured to receive switching reporting information of an antenna switching configuration transmitted by a terminal device.

The processing unit 620 is configured to reconfigure a maximum number of MIMO transmission layers supported by the terminal device according to the switching reporting information.

As an implementation of an embodiment of the present disclosure, the switching reporting information includes: an antenna switching configuration to be triggered by the terminal device; and/or event information of the antenna switching configuration.

As an implementation of an embodiment of the present disclosure, the event information is a trigger level including a first level and a second level, and the second level is smaller than the first level; or the event information is a reporting cause including a first type of cause and a second type of cause.

As an implementation of an embodiment of the present disclosure, the trigger level is the first level, or the reporting cause is the first type of cause, and the processing unit 620 is specifically configured to:

determine a first number of sending channels of the antenna switching configuration, and determine a maximum number of uplink MIMO transmission layers supported by the terminal device according to the first number of sending channels and a preset maximum number of uplink MIMO transmission layers supported by the terminal device; and/or, determine a first number of receiving channels of the antenna switching configuration, and determine a maximum number of downlink MIMO transmission layers supported by the terminal device according to the first number of receiving channels and a preset maximum number of downlink MIMO transmission layers supported by the terminal device.

As an implementation of an embodiment of the present disclosure, the processing unit 620 is specifically configured to:

determine a minimum value between the first number of sending channels and the preset maximum number of uplink MIMO transmission layers as the maximum number of uplink MIMO transmission layers supported by the terminal device.

As an implementation of an embodiment of the present disclosure, the processing unit 620 is specifically configured to:

determine a minimum value between the first number of receiving channels and the preset maximum number of downlink MIMO transmission layers as the maximum number of downlink MIMO transmission layers supported by the terminal device.

As an implementation of an embodiment of the present disclosure, the trigger level is the second level, or the reporting cause is the second type of cause, and the processing unit 620 is specifically configured to:

determine the maximum number of MIMO transmission layers supported by the terminal device based on a configured antenna switching configuration that is adjusted by the network device.

As an implementation of an embodiment of the present disclosure, the processing unit 620 is specifically configured to:

determine a second number of sending channels of the configured antenna switching configuration that is adjusted, and determine a maximum number of uplink MIMO transmission layers supported by the terminal device according to the second number of sending channels and a preset maximum number of uplink MIMO transmission layers supported by the terminal device; and/or, determine a second number of receiving channels of the configured antenna switching configuration that is adjusted, and determine a maximum number of downlink MIMO transmission layers supported by the terminal device according to the second number of receiving channels and a preset maximum number of downlink MIMO transmission layers supported by the terminal device.

As an implementation of an embodiment of the present disclosure, the processing unit 620 is specifically configured to:

determine a minimum value between the second number of sending channels and the preset maximum number of uplink MIMO transmission layers as the maximum number of uplink MIMO transmission layers supported by the terminal device.

As an implementation of an embodiment of the present disclosure, the processing unit 620 is specifically configured to:

determine a minimum value between the second number of receiving channels and the preset maximum number of downlink MIMO transmission layers as the maximum number of downlink MIMO transmission layers supported by the terminal device.

In summary, with receiving the switching reporting information of the antenna switching configuration sent by the terminal device, and reconfiguring the maximum number of MIMO transmission layers supported by the terminal device according to the switching reporting information, the network device may perform different scheduling according to the antenna switching configurations for different types of requirements of the terminal, and adjust the maximum number of MIMO transmission layers configured for the terminal device, causing the maximum number of MIMO transmission layers configured by the network device to match an antenna switching requirement of the terminal. Therefore, a reliability of CSI estimation is improved, a system resource is saved, and it is conducive to terminal power-saving.

FIG. 7 is a schematic diagram of an architecture of an apparatus for adjusting a number of multiple in multiple out (MIMO) transmission layers of a terminal provided in an embodiment of the present disclosure. The apparatus is applicable for a terminal device.

As illustrated in FIG. 7, the apparatus 700 for adjusting the adjusting the number of multiple in multiple out (MIMO) transmission layers of the terminal includes: a transceiver unit 710.

The transceiver unit 710 is configured to send switching reporting information of an antenna switching configuration of the terminal device to a network device.

The transceiver unit 710 is configured to receive a maximum number of MIMO transmission layers supported by the terminal device configured by the network device according to the switching reporting information.

As an implementation of an embodiment of the present disclosure, the switching reporting information includes: an antenna switching configuration to be triggered by the terminal device; and/or event information of the antenna switching configuration.

As an implementation of an embodiment of the present disclosure, the event information is a trigger level including a first level and a second level, and the second level is smaller than the first level; or the event information is a reporting cause including a first type of cause and a second type of cause.

As an implementation of an embodiment of the present disclosure, the apparatus further includes:

a processing unit 720, configured to determine the maximum number of MIMO transmission layers supported and take immediate effect.

As an implementation of an embodiment of the present disclosure, the processing unit 720 is specifically configured to:

determine a first number of sending channels of the antenna switching configuration, and determine a maximum number of uplink MIMO transmission layers supported by the terminal device according to the first number of sending channels and a preset maximum number of uplink MIMO transmission layers supported by the terminal device; and/or, determine a first number of receiving channels of the antenna switching configuration, and determine a maximum number of downlink MIMO transmission layers supported by the terminal device according to the first number of receiving channels and a preset maximum number of downlink MIMO transmission layers supported by the terminal device.

As an implementation of an embodiment of the present disclosure, the processing unit 720 is specifically configured to:

determine a minimum value between the first number of sending channels and the preset maximum number of uplink MIMO transmission layers as the maximum number of uplink MIMO transmission layers supported by the terminal device.

As an implementation of an embodiment of the present disclosure, the processing unit 720 is specifically configured to:

determine a minimum value between the first number of receiving channels and the preset maximum number of downlink MIMO transmission layers as the maximum number of downlink MIMO transmission layers supported by the terminal device.

In summary, with sending the switching reporting information of the antenna switching configuration of the terminal device to the network device, and receiving the maximum number of MIMO transmission layers supported by the terminal device configured by the network device according to the switching reporting information, the network device may perform different scheduling according to antenna switching configurations for different types of requirements of the terminal, and adjust the maximum number of MIMO transmission layers configured for the terminal device, causing the maximum number of MIMO transmission layers configured by the network device to match an antenna switching requirement of the terminal. Therefore, a reliability of CSI estimation is improved, a system resource is saved, and it is conducive to terminal power-saving.

Figure 8:
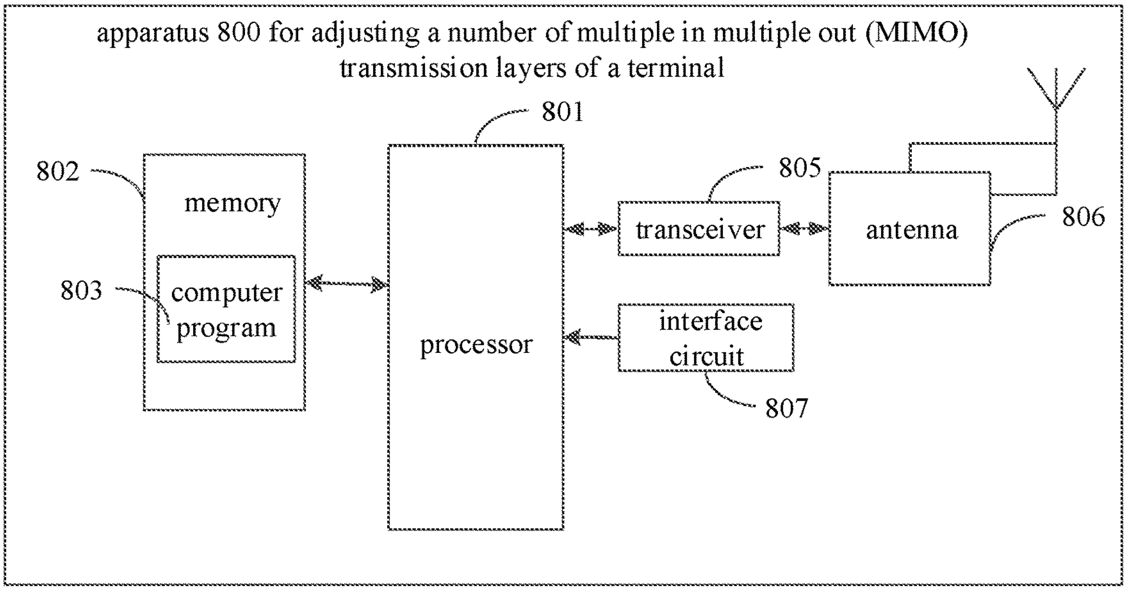
FIG. 8 is a schematic diagram of an architecture of another apparatus for adjusting a number of multiple in multiple out (MIMO) transmission layers of a terminal provided in an embodiment of the present disclosure.

Please refer to FIG. 8, FIG. 8 is a schematic diagram of an architecture of another apparatus for adjusting a number of multiple in multiple out (MIMO) transmission layers of a terminal provided in an embodiment of the present disclosure. The apparatus 800 for adjusting the number of multiple in multiple out (MIMO) transmission layers of the terminal may be a network device, or may be a terminal device, or may also be a chip, a chip system, or a processor that supports the network device to implement the above method, or a chip, a chip system, or a processor that supports the terminal device to implement the above method. This device may be configured to implement the method as described in the above method embodiments, the details of which may refer to illustration of the above method embodiments.

The apparatus 800 for adjusting the number of multiple in multiple out (MIMO) transmission layers of the terminal may include one or more processors 801. The processor 801 may be a general-purpose processor, a dedicated processor, or the like. For example, the processor 801 may be a baseband processor or a central processing unit. The baseband processor may be configured to process a communication protocol and communication data, while the central processor may be configured to control the apparatus for adjusting the number of multiple in multiple out (MIMO) transmission layers of the terminal (such as a base station, a baseband chip, a terminal device, a terminal chip, a DU or a CU, etc.), execute a computer program, and process data from a computer program.

Optionally, the apparatus 800 for adjusting the number of multiple in multiple out (MIMO) transmission layers of the terminal may further include one or more memories 802, each with a computer program 803 stored thereon. The processor 801 may execute the computer program 803 to enable the apparatus 800 for adjusting the number of multiple in multiple out (MIMO) transmission layers of the terminal to execute the method as described in the above method embodiments. The computer program 803 may be embedded in the processor 801, in which case the processor 801 may be implemented by hardware.

Optionally, the memory 802 may further store data. The apparatus 800 for adjusting the number of multiple in multiple out (MIMO) transmission layers of the terminal and the memory 802 may be set separately or integrated together.

Optionally, the apparatus 800 for adjusting the number of multiple in multiple out (MIMO) transmission layers of the terminal may further include a transceiver 805 and an antenna 806. The transceiver 805 may be referred to as a transceiver unit, a transceiver device, or a transceiver circuit, etc., configured to achieve a transceiver function. The transceiver 805 may include a receiver and a sender, and the receiver may be referred to as a receiving device or a receiving circuit, etc., configured to achieve a receiving function; the sender may be referred to as a sending device or a sending circuit, etc., configured to achieve a sending function.

Optionally, the apparatus 800 for adjusting the number of multiple in multiple out (MIMO) transmission layers of the terminal may also include one or more interface circuits 807. The interface circuit 807 is configured to receive code instructions and transmit the code instructions to the processor 801. The processor 801 runs the code instructions causing the apparatus 800 for adjusting the number of multiple in multiple out (MIMO) transmission layers of the terminal to execute the method as described in the above method embodiment.

When the apparatus 800 for adjusting the number of multiple in multiple out (MIMO) transmission layers of the terminal is a network device, the processor 801 is configured to execute steps 201 to 202 in FIG. 2, and steps 301 to 303 in FIG. 3.

When the apparatus 800 for adjusting the number of multiple in multiple out (MIMO) transmission layers of the terminal is a terminal device, the transceiver 805 is configured to execute steps 401 to 402 in FIG. 4, and steps 501 to 503 in FIG. 5.

In an implementation, the processor 801 may include a transceiver for implementing receiving and sending functions. For example, the transceiver may be a transceiver circuit, an interface, or an interface circuit. The transceiver circuit, the interface, or the interface circuit for achieving the receiving and sending functions may be separate or integrated together. The above-mentioned transceiver circuit, interface or interface circuit may be configured for reading and writing codes/data, or the aforementioned transceiver circuit, interface or interface circuit may be configured for transmitting or transferring of signals.

In an implementation, the apparatus 800 for adjusting the number of multiple in multiple out (MIMO) transmission layers of the terminal may include a circuit that may achieve functions of sending, receiving, or communicating in the aforementioned method embodiments. The processor and the transceiver described in the present disclosure may be implemented on an integrated circuit (IC), an analog IC, a radio frequency integrated circuit (RFIC), a mixed signal IC, an application specific integrated circuits (ASIC), a printed circuit boards (PCB), an electronic device, and the like. The processor and the transceiver may also be manufactured using various IC process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The apparatus for adjusting the number of multiple in multiple out (MIMO) transmission layers of the terminal described in the above embodiments may be a network device or a terminal device, but the scope of the apparatus for adjusting the number of multiple in multiple out (MIMO) transmission layers of the terminal described in the present disclosure is not limited to this, and the structure of the apparatus for adjusting the number of multiple in multiple out (MIMO) transmission layers of the terminal may not be limited by FIG. 6 to FIG. 7. The apparatus for adjusting the number of multiple in multiple out (MIMO) transmission layers of the terminal can be an independent device or can be part of a larger device. For example, the apparatus for adjusting the number of multiple in multiple out (MIMO) transmission layers of the terminal may be:

(1) an independent integrated circuit IC, or a chip, or a chip system or subsystem;
(2) a set of one or more ICs, optionally including a storage element for storing data and the computer program;
(3) an ASIC, such as a modem;
(4) modules that can be embedded in other devices;
(5) a receiver, a terminal, a smart terminal, a cellular phone, a wireless device, a handheld device, a mobile unit, an on-board device, a network device, a cloud device, an artificial intelligence device, etc.;
(6) others and the like.

Figure 9:
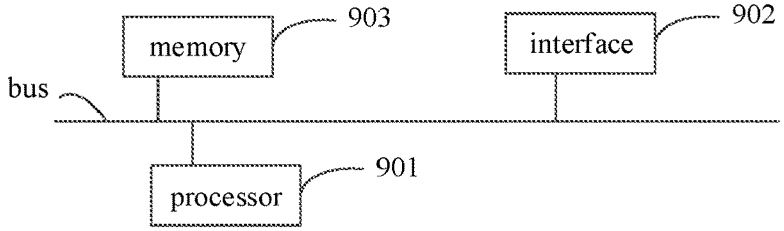
FIG. 9 is a schematic diagram of an architecture of a chip provided in an embodiment of the present disclosure.

For a case that the apparatus for adjusting the number of multiple in multiple out (MIMO) transmission layers of the terminal is the chip or the chip system, please refer to a schematic diagram of a structure of the chip shown in FIG. 9. The chip shown in FIG. 9 includes a processor 901 and an interface 902. A number of processors 901 may be one or more, and a number of interfaces 902 may be more than one.

For a case where the chip is configured to implement functions of the network device in embodiments of the present disclosure:

the interface 902 is configured to receive code instructions and transmit the code instructions to the processor;

the processor 901 is configured to run the code instructions to execute methods as shown in FIGS. 2 to 3.

For a case where the chip is configured to implement functions of the terminal device in embodiments of the present disclosure:

the interface 902 is configured to receive code instructions and transmit the code instructions to the processor;

the processor 901 is configured to run the code instructions to execute methods as shown in FIGS. 4 to 5.

Optionally, the chip may further include a memory 903, configured to store a necessary computer program and data.

Those skilled in the art may also understand that various illustrative logical blocks and steps listed in embodiments of the present disclosure can be implemented through electronic hardware, computer software, or a combination thereof. Whether such functions are implemented through hardware or software depends on a specific application and design requirements of an overall system. Those skilled in the art may use various methods to implement functions for each specific application, but such implementation should not be understood as beyond the scope of protection of embodiments of the present disclosure.

The present disclosed embodiment also provides a communication system, which includes an apparatus for adjusting a number of multiple in multiple out (MIMO) transmission layers of a terminal as a terminal device and an apparatus for adjusting a number of multiple in multiple out (MIMO) transmission layers of a terminal as a network device as described the aforementioned embodiment of FIG. 6 to FIG. 7, or an apparatus for adjusting a number of multiple in multiple out (MIMO) transmission layers of a terminal as a terminal device as described the aforementioned embodiment of FIG. 8 and an apparatus for adjusting a number of multiple in multiple out (MIMO) transmission layers of a terminal as a network device.

The present disclosure also provides a readable storage medium with instructions stored thereon; the instructions is configured to implement functions of any of the above method embodiments when executed by a computer.

The present disclosure also provides a computer program product, configured to implement functions of any of the above method embodiments when executed by a computer.

All or part of the above embodiments can be implemented through software, hardware, firmware, or any combination thereof. When implemented using the software, all or part of the above embodiments can be implemented in the form of computer program product. The computer program product includes one or more computer programs. When loading and executing the computer programs on a computer, the computer programs may be generated all or part of processes or functions according to embodiments of the present disclosure. The computer can be a general-purpose computer, a specialized computer, a computer network, or other programmable devices. The computer programs can be stored on a computer-readable storage media or transmitted from one computer readable storage medium to another, for example, the computer programs can be transmitted from a website site, a computer, a server or a data center to another website site, computer, server, or data center through wired (such as coaxial cable, fiber optic, digital subscriber line (DSL)) or wireless (such as infrared, wireless, microwave, etc.) methods. The computer-readable storage medium can be any available medium that a computer can access, or a data storage device such as a server including one or more available media integrations or a data center. The available media can be a magnetic media (such as a floppy disk, a hard drive, a magnetic tape), an optical media (such as a high-density digital video disc (DVD)), or a semiconductor media (such as a solid state disk (SSD)), etc.

Those ordinary skilled in the art may understand that first, second, and other numerical numbers involved in the disclosure are distinguished only for convenience of description, and are not intended to limit the scope of embodiments of the present disclosure, nor indicate an order.

At least one in this disclosure can also be described as one or more, and a plurality can be two, three, four, or more, without limitation in this disclosure. In embodiments of the present disclosure, for one type of technical feature, technical features in the type of technical feature are distinguished by "first", "second", "third", "A", "B", "C", and "D". The technical features described by "first", "second", "third", "A", "B", "C", and "D" are without any order or sequence.

Correspondences shown in respective tables in the present disclosure can be configured or predefined. The values of information in each table are only examples and can be configured as other values, which will not be limited in the present disclosure. When configuring the correspondence between information and various parameters, it is not necessary to configure all the correspondence shown in each table. For example, in the table in the present disclosure, the correspondences shown in certain rows may not be configured. For example, an appropriate deformation adjustment can be made based on the above table, such as splitting, merging, etc. Names of parameters shown in a title of the above table can also use other names that can be understood by the communication device, and the values or representations of the parameters can also use other values or representations that can be understood by the communication device. When implementing the above tables, other data structures can also be used, such as an array, a queue, a container, a stack, a linear table, a pointer, a linked list, a tree, a graph, a structure, a class, a heap, a hash table, or a hash table.

The term predetermined in this disclosure can be understood as defined, predefined, stored, pre-stored, pre-negotiated, preconfigured, cured, or pre-fired.

Those ordinary skilled in the art can realize that a unit and an algorithm step of each example described in combination with embodiments in the present disclosure can be implemented in electronic hardware, or a combination of computer software and the electronic hardware. Whether such functions are executed in hardware or software depends on specific applications and design constraints of the technical solution. Those skilled may use different methods to implement the described functions for each specific application, but such implementation should not be considered beyond the scope of this disclosure.

Those skilled in the art can clearly understand that for convenience and conciseness of description, specific working processes of the system, device, and unit described above can refer to the corresponding processes in the aforementioned method embodiments, and will not be repeated here.

It should be understood that steps may be reordered, added or deleted using various forms of flow shown above. For example, the steps described in embodiments of the present disclosure may be executed in parallel, sequentially, or in a different order, as long as the desired result of the technical solution disclosed in the present disclosure can be achieved. The present disclosure will not limit it herein.

The above specific implementations do not constitute a limitation to the protection scope of the present disclosure. It should be apparent to those skilled in the art that various modifications, combinations, sub-combinations and alternatives may be made depending on design requirements and other factors. Any modifications, equivalent replacements and improvements made within the spirit and principles of the present disclosure shall be included within the scope of protection of the present disclosure.

The invention claimed is:

1. A method for adjusting a number of multiple in multiple out (MIMO) transmission layers of a terminal, comprising:

receiving, by a network device, switching reporting information of an antenna switching configuration sent by a terminal device; and reconfiguring, by the network device, a maximum number of MIMO transmission layers supported by the terminal device according to the switching reporting information;

wherein the switching reporting information comprises event information of the antenna switching configuration;

the event information is a trigger level comprising a first level and a second level, and the second level is smaller than the first level; or the event information is a reporting cause comprising a first type of cause and a second type of cause;

wherein reconfiguring the maximum number of MIMO transmission layers supported by the terminal device according to the switching reporting information comprises:

in a case where the trigger level is the second level, or the rep ring cause is the second type of cause, determining the maximum number of MIMO transmission layers supported by the terminal device based on a configured antenna switching configuration that is adjusted by the network device.

2. The method according to claim 1, wherein the switching reporting information comprises:

an antenna switching configuration to be triggered by the terminal devices.

3. The method according to claim 1, wherein reconfiguring the maximum number of MIMO transmission layers supported by the terminal device according to the switching reporting information comprises at least one of following steps:

in a case where the trigger level is the first level, or the reporting cause is the first type of cause, determining a first number of sending channels of the antenna switching configuration, and determining a maximum number of uplink MIMO transmission layers supported by the terminal device according to the first number of sending channels and a preset maximum number of uplink MIMO transmission layers supported by the terminal devices;

or, in a case where the trigger level is the first level, or the reporting cause is the first type of cause, determining a first number of receiving channels of the antenna switching configuration, and determining a maximum number of downlink MIMO transmission layers supported by the terminal device according to the first number of receiving channels and a preset maximum number of downlink MIMO transmission layers supported by the terminal device.

4. The method according to claim 3, wherein determining the maximum number of uplink MIMO transmission layers supported by the terminal device according to the first number of sending channels and the preset maximum number of uplink MIMO transmission layers supported by the terminal device comprises:

determining a minimum value between the first number of sending channels and the preset maximum number of uplink MIMO transmission layers as the maximum number of uplink MIMO transmission layers supported by the terminal device.

5. The method according to claim 3, wherein determining the maximum number of downlink MIMO transmission layers supported by the terminal device according to the first number of receiving channels and the preset maximum number of downlink MIMO transmission layers supported by the terminal device comprises:

determining a minimum value between the first number of receiving channels and the preset maximum number of downlink MIMO transmission layers as the maximum number of downlink MIMO transmission layers supported by the terminal device.

6. The method according to claim 1, wherein determining the maximum number of MIMO transmission layers supported by the terminal device based on the configured antenna switching configuration that is adjusted by the network device comprises at least one of following steps:

determining a second number of sending channels of the configured antenna switching configuration that is adjusted, and determining a maximum number of uplink MIMO transmission layers supported by the terminal device according to the second number of sending channels and a preset maximum number of uplink MIMO transmission layers supported by the terminal device;

or, determining a second number of receiving channels of the configured antenna switching configuration that is adjusted, and determining a maximum number of downlink MIMO transmission layers supported by the terminal device according to the second number of receiving channels and a preset maximum number of downlink MIMO transmission layers supported by the terminal device.

7. The method according to claim 6, wherein determining the maximum number of uplink MIMO transmission layers supported by the terminal device according to the second number of sending channels and the preset maximum number of uplink MIMO transmission layers supported by the terminal device comprises:

determining a minimum value between the second number of sending channels and the preset maximum number of uplink MIMO transmission layers as the maximum number of uplink MIMO transmission layers supported by the terminal device.

8. The method according to claim 6, wherein determining the maximum number of downlink MIMO transmission layers supported by the terminal device according to the second number of receiving channels and the preset maximum number of downlink MIMO transmission layers supported by the terminal device comprises:

determining a minimum value between the second number of receiving channels and the preset maximum number of downlink MIMO transmission layers as the maximum number of downlink MIMO transmission layers supported by the terminal device.

9. A method for adjusting a number of multiple in multiple out (MIMO) transmission layers of a terminal, comprising:

sending, by a terminal device, switching reporting information of an antenna switching configuration of the terminal device to a network device; and receiving, by the terminal device, a maximum number of MIMO transmission layers supported by the terminal device configured by the network device according to the switching reporting information;

wherein the switching reporting information comprises ent information of the antenna switching configuration;

the event information is a trigger level comprising a first level and a second level, and the second level is smaller than the first level; or the event information is a reporting cause comprising a first type of cause and a second type of cause;

in a case where the trigger level is the second level, or the reporting cause is second type of cause, the maximum number of MIMO transmission layers supported by the terminal device is determined based on a configured antenna switching configuration that is adjusted by the network device.

10. The method according to claim 9, wherein the switching reporting information comprises:

an antenna switching configuration to be triggered by the terminal device.

11. The method according to claim 9, wherein, after sending the switching reporting information of the antenna switching configuration of the terminal device to the network device, the method comprises:

in a case where the trigger level is the first level, or the reporting cause is the first type of cause, determining the maximum number of MIMO transmission layers supported and taking immediate effect.

12. The method according to claim 11, wherein determining the maximum number of MIMO transmission layers supported comprises at least one of following steps:

determining a first number of sending channels of the antenna switching configuration, and determining a maximum number of uplink MIMO transmission layers supported by the terminal device according to the first number of sending channels and a preset maximum number of uplink MIMO transmission layers supported by the terminal device;

or, determining a first number of receiving channels of the antenna switching configuration, and determining a maximum number of downlink MIMO transmission layers supported by the terminal device according to the first number of receiving channels and a preset maximum number of downlink MIMO transmission layers supported by the terminal device.

13. The method according to claim 12, wherein determining the maximum number of uplink MIMO transmission layers supported by the terminal device according to the first number of sending channels and the preset maximum number of uplink MIMO transmission layers supported by the terminal device comprises:

determining a minimum value between the first number of sending channels and the preset maximum number of uplink MIMO transmission layers as the maximum number of uplink MIMO transmission layers supported by the terminal device.

14. The method according to claim 12, wherein determining the maximum number of downlink MIMO transmission layers supported by the terminal device according to the first number of receiving channels and the preset maximum number of downlink MIMO transmission layers supported by the terminal device comprises:

determining a minimum value between the first number of receiving channels and the preset maximum number of downlink MIMO transmission layers as the maximum number of downlink MIMO transmission layers supported by the terminal device.

15. A network device, comprising a processor and a memory having a computer program stored thereon, wherein the processor is configured to:

receive switching reporting information of an antenna switching configuration sent by a terminal device; and reconfigure a maximum number of MIMO transmission layers supported by the terminal device according to the switching reporting information;

wherein the switching reporting information comprises event information of the antenna switching configuration;

the event information is a trigger level comprising a first level and a second level, and the second level is smaller than the first level; or the event information is a reporting cause comprising a first type of cause and a second type of cause;

wherein the trigger level is the second level, or the reporting cause is the second type of cause, and the processor is configured to:

determine the maximum number of MIMO transmission layers supported by the terminal device based on a configured antenna switching configuration that is adjusted by the network device.

16. A terminal device, comprising: a processor and a memory having a computer program stored thereon, wherein the processor is configured to perform the method according claim 9.

17. A non-transitory computer-readable storage medium having instructions stored thereon, wherein, the method according to claim 1 is implemented when the instructions are executed.

* * * * *